United States Patent
Orlandi et al.

(10) Patent No.: US 8,171,970 B2
(45) Date of Patent: May 8, 2012

(54) APPARATUS FOR LABELLING

(75) Inventors: Ireneo Orlandi, Curtatone (IT);
Maurizio Pedercini, Marmirolo (IT);
Matteo Grioni, Castellucchio (IT)

(73) Assignee: Sacmi Verona S.p.A., Imola (BO) (IT)

( * ) Notice: Subject to any disclaimer, the term of this patent is extended or adjusted under 35 U.S.C. 154(b) by 596 days.

(21) Appl. No.: 12/306,065

(22) PCT Filed: Jun. 15, 2007

(86) PCT No.: PCT/IB2007/001613
§ 371 (c)(1),
(2), (4) Date: Mar. 16, 2009

(87) PCT Pub. No.: WO2007/148189
PCT Pub. Date: Dec. 27, 2007

(65) Prior Publication Data
US 2009/0313947 A1 Dec. 24, 2009

(30) Foreign Application Priority Data
Jun. 22, 2006 (IT) .............................. MO2006A0203

(51) Int. Cl.
*B32B 37/00* (2006.01)
(52) U.S. Cl. ..................... 156/379.6; 156/497; 156/499; 156/556; 156/580.1; 156/582; 156/583.1
(58) Field of Classification Search ................. 156/73.1, 156/82, 84, 184, 185, 187, 272.2, 272.8, 156/379.6, 497, 499, 556, 580, 581, 582, 156/583.1, 580.1, 580.2
See application file for complete search history.

(56) References Cited

U.S. PATENT DOCUMENTS

| 4,199,851 | A | 4/1980 | Doherty |
| 6,505,982 | B2 * | 1/2003 | Edenlund et al. ............. 400/618 |
| 6,808,593 | B2 * | 10/2004 | McCardell ................. 156/379.6 |
| 2001/0007620 | A1 | 7/2001 | Edenlund et al. |
| 2003/0178148 | A1 | 9/2003 | McCardell |

FOREIGN PATENT DOCUMENTS

| EP | 1 153 837 | 11/2001 |
| GB | 2 306 437 | 5/1997 |
| WO | 00/68091 | 11/2000 |
| WO | 2004/020291 | 3/2004 |
| WO | 2004/065273 | 8/2004 |

OTHER PUBLICATIONS

International Search Report for PCT/IB2007/001613, mailed Nov. 21, 2007.
International Preliminary Report on Patentability for PCT/IB2007/001613, dated Aug. 26, 2008.

* cited by examiner

*Primary Examiner* — James Sells
(74) *Attorney, Agent, or Firm* — Nixon & Vanderhye P.C.

(57) ABSTRACT

An apparatus for making "shrink sleeve" labels, comprises a carousel provided peripherally with a spindle arrangement shaped for being wound by portions of film made of plastics, a transferring unit arranged peripherally to the carousel for transferring each portion of film made of plastics on a respective spindle, an electrostatic-charge generating device arranged downstream of the transferring unit such as to charge electrostatically the portions of film made of plastics; a method for labelling containers comprises forming a sleeve and covering a container with the sleeve, the forming comprising winding a portion of film made of plastics to a respective spindle and maintaining the portion of film made of plastics adhering to the spindle in an electrostatic manner.

7 Claims, 3 Drawing Sheets

APPARATUS FOR LABELLING

This application is the U.S. national phase of International Application No. PCT/IB2007/001613, filed 15 Jun. 2007, which designated the U.S. and claims priority to Italian Application No. MO2006A000203, filed 22 Jun. 2006; the entire contents of each of which are hereby incorporated by reference.

The invention relates to an apparatus and a method for labelling containers, in particular, for making and subsequently applying to containers sleeve or "shrink sleeve" labels in PET, PVC, polypropylene (PP), polystyrene (PS), or other materials suitable for being heat shrunk.

The term "shrink sleeve" is taken to mean tubular labels made of film made of plastics that are placed on a container and are subsequently heated to shrink onto the external surface of the container and take the shape thereof.

In known labelling apparatuses, the "shrink sleeve" labels are obtained from a film made of shrinkable plastics that is unwound from a reel and is advanced by a moving device to a transferring drum.

A cutting device cuts the film made of plastics transversely to the advancing direction, in such a way as to obtain portions of film made of plastics having a preset length, measured longitudinally to the film made of plastics, so as to obtain "shrink sleeve" labels having a preset diameter. The cut portions are wound onto consecutive zones of a transferring drum and are maintained adhering to the external surface thereof.

The transferring drum is, adjacent to a rotatable carousel that rotatably supports a plurality of spindles peripherally and angularly equidistant from one another, with each spindle there being associated a support shaped for supportingly receiving a container to be labelled.

Each spindle is shaped for receiving from the transferring drum a portion of film made of plastics from which a sleeve is obtained that is a precursor of a "shrink sleeve" label.

The portions of film made of plastics can be welded by one or more external welding arrangements, that are generally fixed with respect to the base of the machine or by one or more welding arrangements associated with each spindle.

The welding arrangement may, for example, be an ultrasound, a hot-roller, or a hot-air welding arrangement.

In the aforesaid labelling machines the portions of film made of plastics may form creases whilst they are wound on the respective spindles.

Further, in such machines it is desirable to maintain the end flaps of each portion overlapping and mutually adhering, the portion being wound around a respective spindle so as to promote the welding thereof.

An object of the invention is to improve the apparatuses and methods for obtaining "shrink sleeve" labels for containers.

Another object of the invention is to obtain an apparatus and a method that enable the label portions to be arranged in an extended manner and without creases on the external surface of the respective spindles.

According to the invention, there is provided an apparatus for making "shrink sleeve" labels, comprising a carousel provided peripherally with a spindle arrangement shaped for being wound by portions of film made of plastics, a transferring unit arranged peripherally to said carousel for transferring each portion of film made of plastics to a respective spindle, an electrostatic-charge generating device provided downstream of said transferring unit, wherein said electrostatic-charge generating device comprises an electrostatic-charge generating device comprises an electrostatic-charge generating bar arranged along the periphery of said carousel which charges said portions electrostatically for maintaining opposite flaps of each said portions adhering to one another through the effect of electrostatic charges.

Owing to the fact that the portions of film are treated electrostatically they are evenly extended on the surface of the respective spindles and are free of creases.

Further, the flaps opposite each portion of film are maintained adhering to one another through the effect of the electrostatic charges and can thus be welded simply and without defects.

There can be provided a welding arrangement of the flaps of the portions of film of known type such as to act by pressing together the flaps opposite each portion, or such as to cause welding without coming into contact with the flaps (for example laser welding).

The opposite flaps of each portion of film made of plastics can be joined together with systems other than welding, for example through gluing.

Further, if the effect of temporary adhesion of the portions of film made of plastics to the respective spindles is sufficient, it is possible to provide spindles devoid of the air suction system that is normally provided for maintaining the portions of film made of plastics adhering temporarily to the spindles.

The invention can be better understood and implemented with reference to the attached drawings, which show an embodiment thereof by way of non-limiting example, in which.

Figure 1:
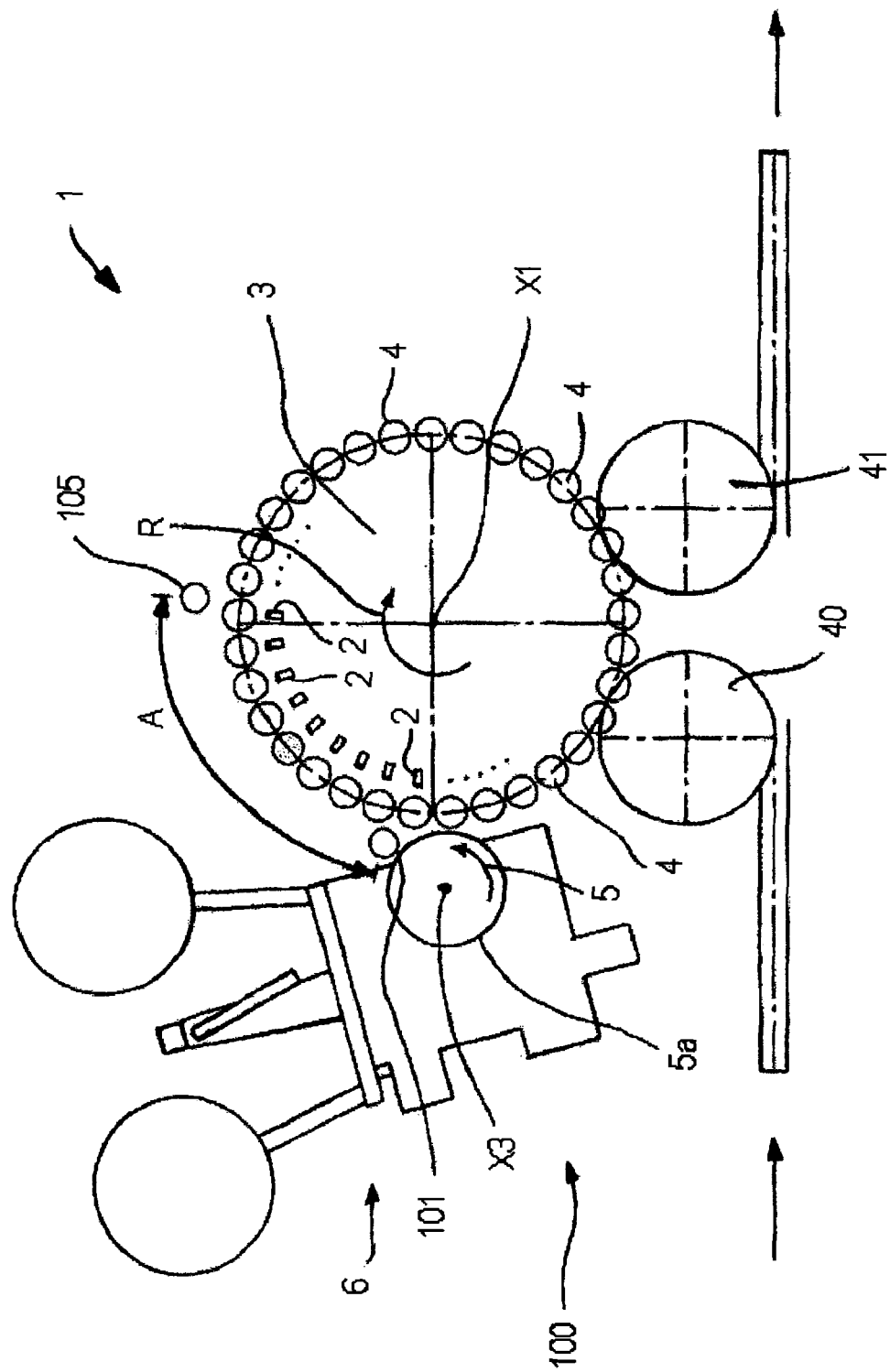
FIG. 1 is a schematic view from above of an apparatus for labelling containers according to the invention.

With reference to FIG. 1, an apparatus 1 for labelling containers (not shown), comprises a carousel 3, which is rotatable around a first rotation axis X1, in a first rotation direction R.

The carousel 3 peripherally supports a spindle arrangement 4 on which sleeves 11 are formed that are the precursors of "shrink sleeve" labels.

The spindle arrangement comprises a plurality of spindles 4 that are distributed angularly equidistant on the periphery of the carousel 3, and is rotatable, in a respective rotation direction Q corresponding to the first rotation direction R, around respective second axes X2 arranged substantially parallel to the first rotation axis X1.

The apparatus 1 comprises a moving device 6 that moves along an advancing path a film made of heat shrinkable plastics that is removed from a reel on which it is initially wound.

With the moving device 6 there is associated a cutting devices, arranged for cutting the film made of plastics transversely to the advancing path, so as to obtain portions of film made of plastics 8 (FIG. 2), each of which is given a spindle 4.

The moving device 6 passes through a transferring unit 100 comprising a transferring drum 5, which is rotatable in a second rotation direction S opposite the first direction R and around a third rotation axis X3 arranged parallel to the second axis X2.

The transferring drum 5 comprises a side wall 5a provided with a plurality of holes connected to a pneumatic device that is able to suck air inside the transferring drum 5 or expel air from the transferring drum 5 to the exterior through the aforesaid holes, in function of an angular position of the latter with respect to the third axis X3.

The sucking of the air through the holes makes it possible to make a portion 8 adhere to the side wall 5a, immediately after the latter has been separated from the film made of plastics. Through the expulsion of air from the transferring drum 5, through the aforesaid holes, it is on the other hand possible to detach the portion 8 from the side wall 5a, in such a way that it is transferred to a spindle 4 near the transferring drum 5.

Downstream of the transferring unit 5 there is provided an electrostatic-charge generating bar 101 that is arranged on the periphery of the carousel 3 so that each spindle 4 passes through the operating range of the generating bar 101 during the progressive rotation thereof around the axis X2 and of the carousel 3.

The generating bar 101 and the positioning thereof are chosen in an appropriate manner, i.e. so that when the portion 8 of film made of plastics that is entirely wound or is still being wound around the respective spindle 4, passes in front of the generating bar 101 the portion B become electrostatically charged and adheres to the spindle 8 on which it is wound.

Figure 2:
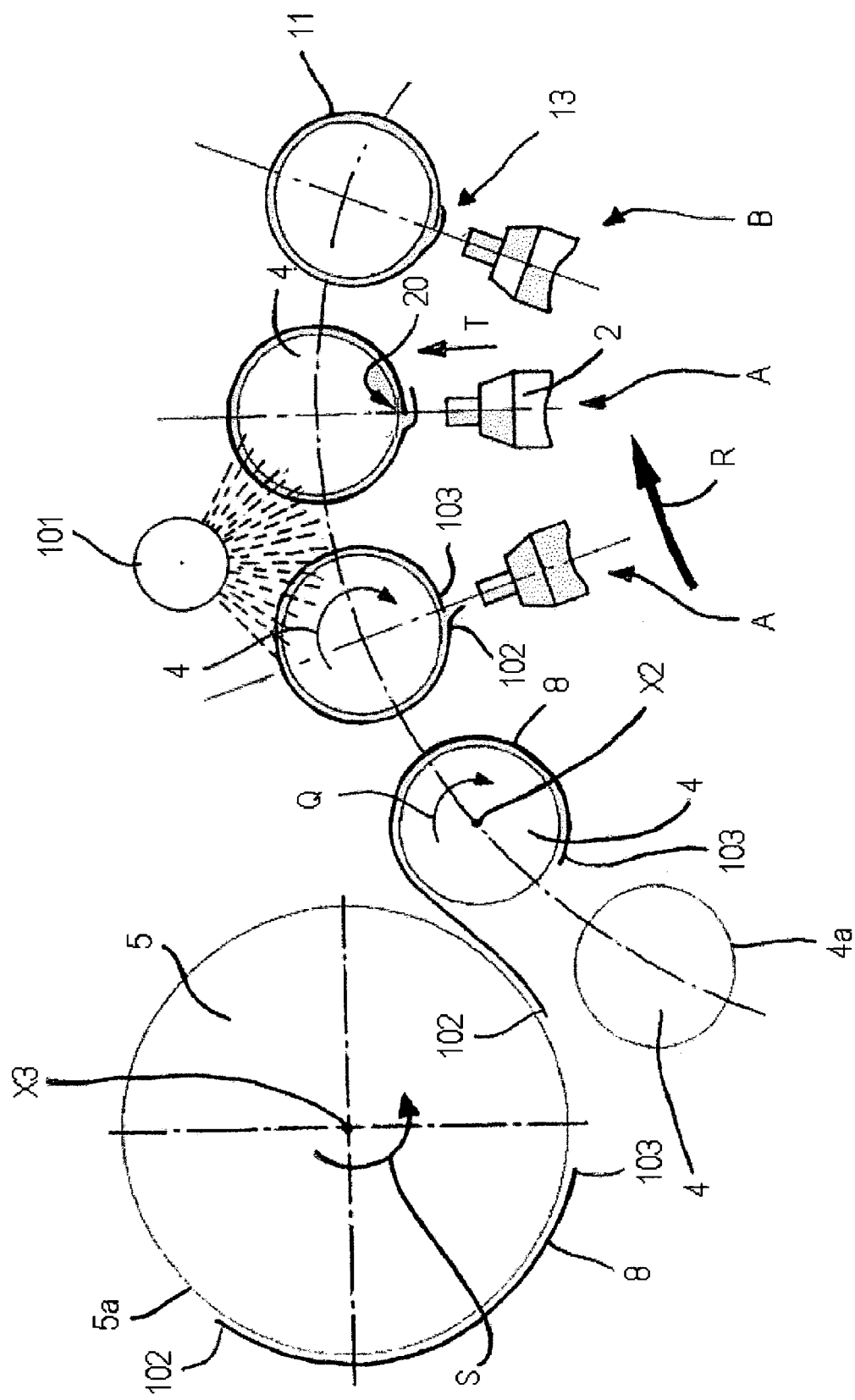
FIG. 2 is an enlarged schematic view of a portion of the apparatus in FIG. 1.

As a consequence thereof, uniform adhesion of the portion 8 to the respective spindle 4 is obtained and in particular the opposite flaps 102, 103 of each portion 8 that were spaced apart from one another upstream of the generating bar 101 are now superimposed on one another (see FIG. 2 on the right).

Each spindle 4 comprises a side surface 4a around which, by virtue of the rotation of the spindle around the second rotation axis X2, the portion of film 8 is wound, in such a way that the opposite flaps thereof, which have to be welded in such a way as to form a sleeve 11 that is the precursor of a label, are partially superimposed on one another in a superimposing zone 13 of preset width.

The side surface 4a of each spindle 4 can be provided with respective holes through which air is sucked in from the exterior to the interior of the spindle 4 or air is expelled to the exterior of the spindle 4, similarly to what occurs in the transferring drum 5.

Through the air sucked through the further holes it is possible to make a portion 8 adhere to the side surface 4a, which portion 8 is removed from the transferring drum 5, or it is possible to expel air so as to detach from the side surface 4a a sleeve 11 that has just been obtained from a portion 8 and is ready for being applied to a container (not shown).

The apparatus 1 is further provided with a welding arrangement comprising a plurality of welding devices 2, each of which is associated with a respective spindle 4 and arranged for welding together in the superimposing zone 13 the opposite flaps of the portions 8 of film made of plastics supported by the spindle.

The welding devices 2 are mounted on the carousel 3 angularly equidistant from one another, and are movable along respective operating directions T, from an inactive position A in which they are inactive and spaced away from the respective spindle 4, to a work position B, in which they clamp the superimposed flaps of the portion 8 of film made of plastics against the spindle 4 to weld them owing to the combined action of pressure and heat.

The operating direction T of each welding device 2 is substantially radial to the carousel 3 and substantially orthogonal to the second rotation axis X2 and to the side surface 4a of each spindle 4.

Each welding device 2 is arranged for performing spot welding and can operate using various known welding technologies, for example, ultrasound, hot-roller, hot blade, hot air spot, laser.

Figure 3:
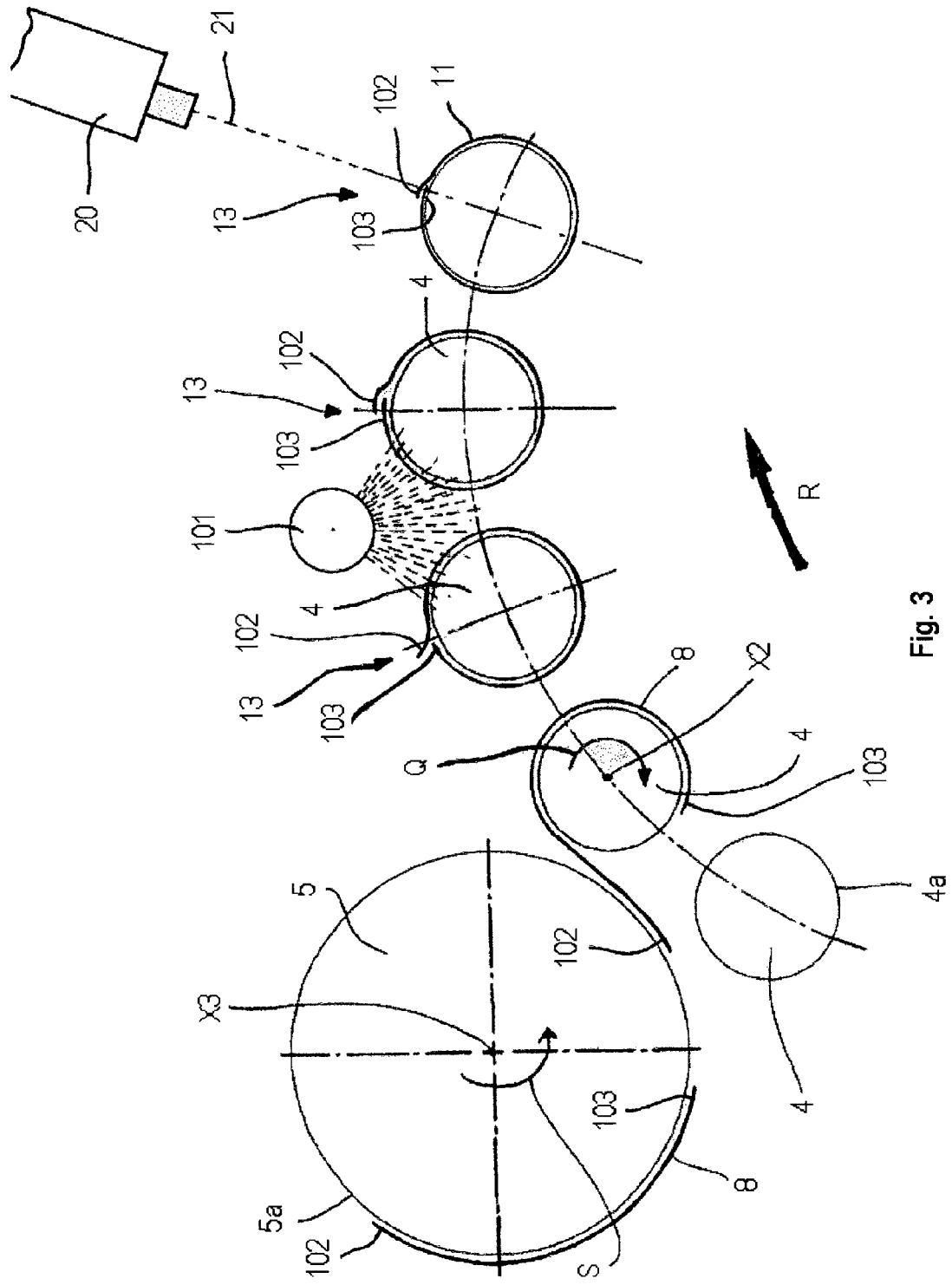
FIG. 3 is a schematic view of an apparatus for labelling containers where welding is achieved by one or more external welding arrangements, for example a laser welding arrangement without contact.

As shown in FIG. 3, there can be provided a laser welding device 20 supported on the side of the carousel 3 in such a way as to direct a laser beam 21 to the superimposing zone 13 to weld the flaps 102, 103 to one another.

The apparatus 1 comprises an inlet wheel or star 40 that conveys containers to be labelled onto the carousel 3. The inlet wheel 40 is adjacent to the carousel 3 and is arranged in such a way that peripheral zones of the carousel 3 interact first therewith and subsequently with the transferring drum 5.

The apparatus 1 further comprises an outlet wheel or star 41 that removes from the carousel 3 containers that were covered with a sleeve 11. The outlet wheel 41 is adjacent to the carousel 3 and arranged downstream of the transferring drum 5 with respect to the first rotation direction R.

The operation of the apparatus 1 for labelling containers provides that each container to be labelled is transferred from the inlet carousel 40 to a spindle 4 and is then advanced by the rotation of the carousel 3 near the transferring drum 5 to receive from the latter a portion 8 of film made of plastics.

In particular, a first end zone of the portion 8 of the film made of plastics is moved away from the side wall 5a of the transferring drum 5 by air that is expelled through the holes of the side wall 5a and is made to adhere through air that is sucked through the respective further holes to the side surface 4a of the spindle 4 that is rotated in the meanwhile. Similarly, further zones of the portion 8 are progressively made to adhere to the side surface 4a.

The spindle 4 is rotated until the opposite flaps 102, 103 of the portion 8 of material adhere to one another, through the electrostatic effect, completely in the superimposing zone 13 to ensure correct welding thereof so as to obtain a sleeve 11 that is a precursor of a "shrink sleeve" label.

After receiving the portion 8, the spindle 4 is positioned in such a way that the superimposing zone 13 faces the respective welding device 2.

Only then, i.e. downstream of the generating bar 101, is each welding device 2 moved along the respective operating direction T from the inactive position A to the work position B, in which it abuts on the superimposing zone 13. Each welding device 2 acts on the superimposing zone 13 for an interval of time corresponding to a certain angular rotation section A of the carousel 3 starting from a zone downstream of the generating bar 101. Downstream of the arc A, i.e. after the welding devices 2 have permanently joined the flaps 102, 103, there can be provided an antistatic bar 105 that is used to eliminate the electrostatic charges from each sleeve 11 in order to facilitate the removal of each sleeve 11 from the respective spindle 4 and the covering of a container therewith.

Each container that is subsequently covered with a sleeve 11 is transferred to the outlet wheel 41 to be directed to a heating station in which the label is subjected to heat treatment, as a result of which it retracts and adheres to the external surface of the container 50.

It should be observed that the most retracted flap 102 with respect to the rotation direction Q during rotation of the carousel 3 transits in front of the electrostatic-charge generating bar 101.

In the case shown in FIG. 2, in which the welding devices 2 are installed on the carousel 3 and are each arranged further inside a corresponding spindle 4, as the superimposing zone 13 is formed towards the outside of the carousel 3, it is necessary for each spindle 4 to be rotated by a suitable angle before the superimposing zone 13 arrives in front of the welding device 2.

On the other hand, in the case illustrated in FIG. 3, as the welding device is installed outside the spindles 4, each superimposing zone 13 is already positioned both towards the welding device and towards the generating bar 101 without necessarily having to rotate.

The invention claimed is:

1. Apparatus for making "shrink sleeve" labels, comprising a carousel provided peripherally with a spindle arrangement shaped for being wound by portions of film made of plastics, a transferring unit arranged peripherally to said carousel for transferring each of said portions to a respective spindle, an electrostatic-charge generating device provided downstream of said transferring unit, wherein said electrostatic-charge generating device comprises an electrostatic-charge generating bar arranged along the periphery of said carousel which charges said portions electrostatically for maintaining opposite flaps of each of said portions adhering to one another through the effect of electrostatic charges.

2. Apparatus according to claim 1, and further comprising a joining arrangement arranged for joining together said opposite flaps.

3. Apparatus according to claim 2, wherein said joining arrangement is a welding arrangement.

4. Apparatus according to claim 3, wherein said welding arrangement comprises a plurality of welding devices, each corresponding to a respective spindle of said spindle arrangement.

5. Apparatus according to claim 3, wherein said welding arrangement comprises a welding device common to a plurality of spindles of said spindle arrangement.

6. Apparatus according to claim 2 and further comprising an antistatic device such as to make said portions electrically neutral after the respective flaps have been joined together.

7. Apparatus according to claim 3, wherein said welding arrangement is selected from a group comprising: an ultrasound, a hot-roller, a hot-blade, a hot-air spot, and a laser welding arrangement.

* * * * *